United States Patent
Stephens et al.

(10) Patent No.: US 8,141,234 B2
(45) Date of Patent: Mar. 27, 2012

(54) OPTIMAL MAGNETIZATION OF NON-MAGNETIZED PERMANENT MAGNET SEGMENTS IN ELECTRICAL MACHINES

(75) Inventors: Charles Michael Stephens, Pattersonville, NY (US); Konrad Roman Weeber, Rexford, NY (US); Steven Joseph Galioto, Latham, NY (US); Ralph James Carl, Jr., Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 38 days.

(21) Appl. No.: 12/581,185

(22) Filed: Oct. 19, 2009

(65) Prior Publication Data

US 2011/0088249 A1 Apr. 21, 2011

(51) Int. Cl.
  *H02K 15/02* (2006.01)
(52) U.S. Cl. .............. 29/598; 29/596; 310/43
(58) Field of Classification Search ........... 29/596–598, 29/732–736; 310/156.31, 156.43, 261; 335/216, 335/284, 296; 361/143
See application file for complete search history.

(56) References Cited

U.S. PATENT DOCUMENTS

| | | | | |
|---|---|---|---|---|
| 6,104,115 A | * | 8/2000 | Offringa et al. | 310/156.28 |
| 6,542,348 B1 | * | 4/2003 | Stupak, Jr. | 361/147 |
| 7,045,923 B2 | | 5/2006 | Fujii | |
| 7,228,616 B2 | * | 6/2007 | Stephens | 29/598 |
| 7,761,976 B2 | * | 7/2010 | Aronsson et al. | 29/598 |
| 2005/0030136 A1 | | 2/2005 | Babich | |

FOREIGN PATENT DOCUMENTS

WO 2005/064623 A2 7/2005

OTHER PUBLICATIONS

Al-Anani, N.A.; Jewell, G.W.; Howe, D.; "Design, Analysis, and Simulation of Impulse Magnetization Systems Based on Solenoid Magnetizing Fixtures"; Journal: COMPEL: The International Journal for Computation and Mathematics in Electrical and Electronic Engineering; Year:1992 ,vol. 11, Issue:1,p. 225-228.
George J. Cunningham; "Magnetization and Magnetic Measurement of Multipole High Coercivity Permanent Magnet Rotors"; Electrical Electronics Insulation Conference, 1995, and Electrical Manufacturing & Coil Winding Conference; Proceedings Publication Date: Sep. 18-21, 1995;on pp. 301-302.

* cited by examiner

*Primary Examiner* — Minh Trinh
(74) *Attorney, Agent, or Firm* — Andrew J. Caruso

(57) ABSTRACT

A method for magnetizing a rotor of an electrical machine is provided. The method includes assembling an array of non-magnetized anisotropic permanent magnet segments around a rotor spindle encased in a metallic ring. The method also includes determining multiple optimal magnetization orientation directions of the non-magnetized anisotropic permanent magnet segments. Further, the method includes positioning the assembled non-magnetized anisotropic permanent magnet segments around the rotor spindle such that the optimal magnetization orientation directions of the anisotropic permanent magnet segments are aligned with multiple flux lines produced by a magnetization fixture. Finally, the method includes energizing the magnetization fixture for magnetizing the segments via a pulse direct current for an optimal duration of the pulse.

9 Claims, 4 Drawing Sheets

OPTIMAL MAGNETIZATION OF NON-MAGNETIZED PERMANENT MAGNET SEGMENTS IN ELECTRICAL MACHINES

BACKGROUND

The invention relates generally to electrical machines and more particularly, to magnetization of permanent magnet rotors in electrical machines.

Generally, an electrical machine, such as a motor or a generator, includes a rotor disposed within a stator and utilized to convert electrical power to mechanical power or vice versa. Certain electrical machines use permanent magnet type rotors, which rotors reduce the size and enhance the overall efficiency of the machine. Such a rotor generally includes an annular permanent magnet, disposed over a rotor spindle. In larger machines, the permanent magnet is generally formed by assembling a plurality of permanent magnets assembled around a rotor spindle. In general, the permanent magnet segments are magnetized prior to assembly on the rotor spindle. For example, the permanent magnet segments are cut and ground to shape from larger unfinished magnet blocks, after which the segments are magnetized individually in a solenoid coil. In certain applications, especially in larger machines, magnetization of the permanent magnet segments is achieved via a magnetization vector proposed by K. Halbach (also known as Halbach magnetization), which, when applied to the surface of the permanent magnets, results in a more sinusoidal shaped flux distribution within the electrical machine, thereby reducing AC harmonic losses and reducing torque ripple, vibration and acoustic noise. The permanent magnet segments are subsequently adhesively bonded to the rotor spindle.

However, assembly of the rotor from pre-magnetized permanent magnet segments may be a cumbersome process, especially in larger electrical machines, as it may be time consuming and unwieldly. The process can involve substantial forcing and aligning by mechanical devices to position and restrain the energized permanent magnet segments. The process is prone to physical accidents if energized permanent magnet blocks escape restraint. Thus, for farbrication convenience, the rotor is assembled with un-magnetized magnets and magnetized all at once by imparting necessary magnetic fields to the un-magnetized magnets. Further, electrical machines such as a high-speed electrical motor may also include a holding ring or a retaining ring around the permanent magnet assembly on the rotor to prevent fracturing and scattering of the permanent magnet assembly by centrifugal forces. Often the retaining ring is made of a metallic material, thereby, the retaining ring inherits metallic property of having electrical conductivity to a substantial degree. During magnetization of the un-magnetized magnets, the metallic retaining ring or holding ring around the permanent magnet assembly is induced with eddy currents which impede the un-magnetized magnets from becoming magnetized.

Accordingly, there exists a need for a simpler and efficient technique for magnetization of the un-magnetized magnet segments in electrical machine rotors, wherein a metallic retaining ring is utilized for magnet retention in a permanent magnet AC synchronous machine.

BRIEF DESCRIPTION

In accordance with an embodiment of the invention, a method for magnetizing a rotor of an electrical machine is provided. The method includes assembling an array of non-magnetized anisotropic permanent magnet segments around a rotor spindle encased in a retaining ring. The method also includes determining multiple optimal magnetization orientation directions of the non-magnetized anisotropic permanent magnet segments. Further, the method includes positioning the assembled non-magnetized anisotropic permanent magnet segments around the rotor spindle such that the optimal magnetization orientation directions of the anisotropic permanent magnet segments are aligned with multiple flux lines produced by a magnetization fixture. Finally, the method includes energizing the magnetization fixture for magnetizing the segments via a pulse direct current for an optimal duration of the pulse.

In accordance with another embodiment of the invention, a magnetizer system for a rotor of an electrical machine is provided. The magnetizer system includes a magnetizing yoke, wherein the magnetizing yoke comprises multiple pole-pieces extending therefrom. The magnetizer system also includes multiple coils wound around the pole-pieces. Further, the magnetizer system includes a magnetizing circuit for energizing a magnetization fixture via a pulse direct current for an optimal duration of the pulse.

In accordance with yet another embodiment of the invention, a method for manufacturing a rotor of an electrical machine is provided. The method includes providing a rotor assembly with an array of non-magnetized permanent magnet segments around a rotor spindle encased in a retaining ring. The method also includes providing a magnetizer system coupled to the rotor assembly. The magnetizer system includes a magnetizing yoke, wherein the magnetizing yoke further includes multiple pole-pieces extending therefrom. The magnetizer system also includes a plurality of coils wound around the pole-pieces and a magnetizing circuit for energizing a magnetization fixture via a pulse direct current for an optimal duration of the pulse. Finally, the method includes magnetizing the array of non-magnetized permanent magnet segments of the rotor assembly via a magnetic field generated by energizing the magnetization fixture.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards magnetizing of a rotor of an electrical machine using a pulse direct current for an optimal duration of the pulse. As used herein, the term 'crowbar' refers to an electrical circuit used to prevent an overvoltage condition of a power supply unit from damaging the circuits attached to the power supply. The present invention addresses methods of assembling a rotor including non-magnetized permanent magnet segments with metallic retaining ring and magnetizing the rotor in a magnetizer system that includes flowing of current for an optimal duration in the pulse. The present invention is also directed towards the calculation of the optimal "on time" of the switch controlling the current flow, which is requisite for effectively magnetizing the non-magnetized permanent magnet segments of the rotor by suppressing the eddy currents in the retaining ring of the rotor.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
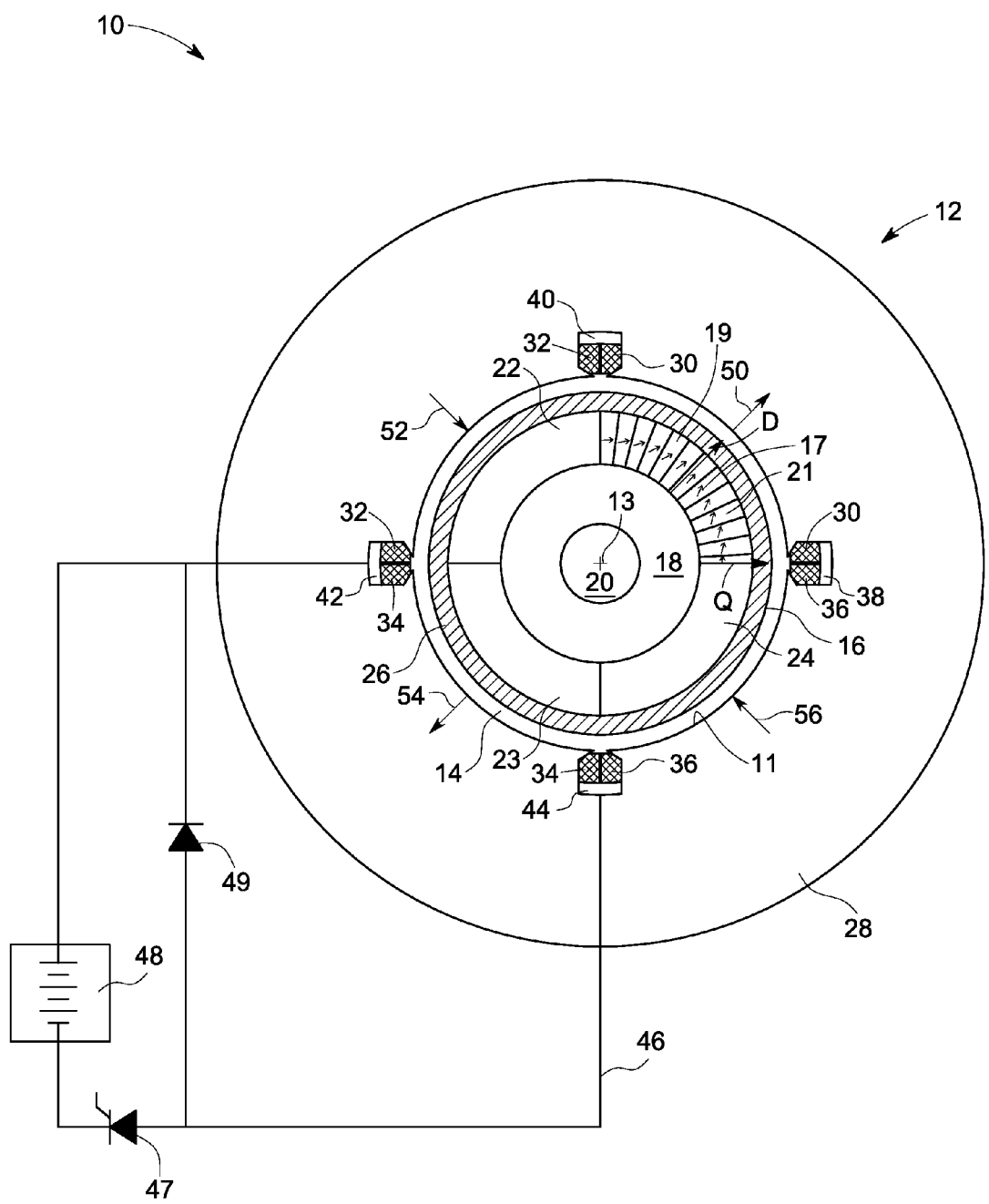
FIG. 1 illustrates a rotor magnetizer system in accordance with an exemplary embodiment of the invention.

FIG. 1 illustrates a magnetizer system 10 for magnetizing a rotor in accordance with an exemplary embodiment of the invention. The magnetizer system 10 includes a magnetization fixture 12 extending along a longitudinal axis 13 with an inner surface 11 defining a cavity 14. The magnetization fixture 12 is configured to generate magnetic fields in the cavity 14. A rotor assembly 16 is securely positioned along the longitudinal axis 13 within the cavity 14 of the magnetization fixture 12 for magnetization of multiple non-magnetized permanent magnet segments of the rotor assembly 16.

As illustrated herein, the rotor assembly 16 includes a rotor spindle 18 mounted on a shaft 20. In one embodiment, the shaft 20 may be formed integral to the rotor shaft 18. In another embodiment, the rotor spindle 18 and the shaft 20 are formed from a ferromagnetic material. In an exemplary embodiment, the rotor assembly 16 includes rotor pole pieces 21, 22, 23 and 24 around the rotor spindle 18. Each of the pole pieces includes multiple non-magnetized permanent magnet segments 19. The non-magnetized permanent magnet segments 19 are arranged around the rotor spindle 18 to form an annular array. In accordance with one aspect of the present technique, the permanent magnet segments of the rotor assembly 16 form a Halbach array (i.e. obtained by Halbach magnetization discussed above) to produce an essentially sinusoidal shaped flux distribution with low harmonic content within an electrical machine. This reduces AC harmonic losses, torque ripple, vibration and acoustic noise. In the Halbach array (as shown in rotor pole piece 21), the orientation direction 17 of each permanent magnet segment 19 is such that the direction 17 is nearly tangential to the direction of rotation of the rotor at a quadrature axis (hereinafter referred to as a Q-axis) of each rotor pole piece 21, 22, 23 and 24, and is nearly normal to the rotation direction at a direct axis (hereinafter referred to as a D-axis) of each of the rotor pole pieces 21, 22, 23 and 24. The D-axis may be defined as the location in a magnetic pole wherein the magnetic field is most strongly radially directed, and whereas the Q-axis generally corresponds to the location in the magnetic pole wherein the magnetic field is most strongly peripherally directed. It should be noted that although the Q and D axes of a magnetic pole differ electrically by 90 degrees, their relative physical locations depend on the geometry and number of poles of the rotor. For example, in a four-pole rotor, the Q and D axes of each pole are angularly separated by exactly 45 degrees.

As illustrated in FIG. 1, the rotor assembly 16 also includes a retaining ring 26 covering an outer periphery of the rotor assembly 16 to secure the multiple permanent magnet segments 19 in their intended location in the rotor assembly 16. In a particular embodiment, the retaining ring 26 is formed from high strength metal for providing substantial centrifugal constraint of the magnet segments. The magnetization fixture 12 is configured to generate magnetic fields in the cavity 14 for magnetizing the non-magnetized anisotropic permanent magnet segments 19 of the rotor assembly 16.

Furthermore, the magnetization fixture 12 includes multiple magnetization coils wound around a magnetizing yoke 28. Generally, the number of magnetizing coils chosen is equal to the number of pole pieces of the rotor. Accordingly, the magnetization fixture 12 includes four magnetizing coils 30, 32, 34 and 36 accommodated for a four pole rotor as a example within slots 38, 40, 42 and 44 provided on the magnetization yoke 28. The magnetizing coils 30, 32, 34 and 36 are suitably arranged in a magnetizing circuit 46. The magnetizing coils 30, 32, 34 and 36 are further energized by a power source 48 provided in the magnetizing circuit 46. The magnetization fixture 44 also includes magnetization poles pieces 50, 52, 54 and 56 extending inwards from the magnetizing yoke 28. The multiple magnetizing coils 30, 32, 34 and 36 are wound around the pole pieces 50, 52, 54 and 56 and produces magnetic flux field in the cavity 14 when energized by the power source 48. The power source 48 energizes the magnetization fixture 44 for magnetizing the segments via a pulse direct current for an optimal duration of the applied pulse. In one embodiment, the magnetizing coils 30, 32, 34 and 36 includes hollow tube coils configured to allow a flow of a coolant therethrough. As illustrated, the magnetizing circuit 46 also includes a semiconducting switch 47 configured to control current flow during charging or discharging of power source 48 in the magnetizing coils 30, 32, 34 and 36. The magnetizing circuit 46 also includes at least one crowbar diode 49 for providing a flow of current when the semiconductor switch 47 is in a non-conducting state. It is to be noted that the magnetizer system 10 may provide a source impedance equal to an impedance of the magnetization fixture 44.

Figure 2:
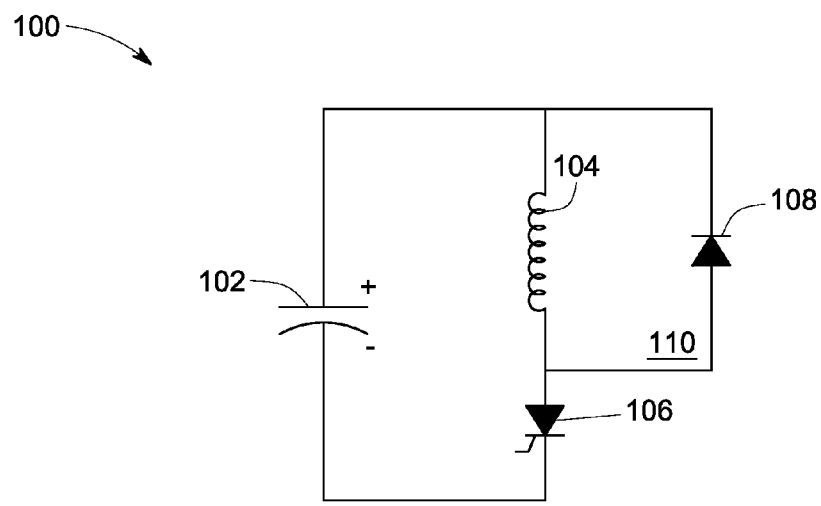
FIG. 2 illustrates a magnetizer circuit of the rotor magnetizer system in accordance with an exemplary embodiment of the invention.

FIG. 2 illustrates a schematic diagram representative of a magnetizing circuit 100 (referred to as 46 in FIG. 1) of the magnetizer system 10 in accordance with an exemplary embodiment of the invention. As illustrated, the magnetizing circuit 100 includes a power source 102 for energizing the coils 104 (referred as magnetizing coils 30, 32, 34 and 36 in FIG. 1) located in the magnetization fixture 12 of the magnetizer system 10 in FIG. 1. The coils 104 are essentially inductive for generating the magnetic flux field, which in turn, magnetizes the non-magnetized permanent magnet segments of the rotor. In one embodiment, the power source 102 is a pulsed DC power source. The current flow in the magnetizer circuit 100 increases from zero to a crest in a pulse mode. In one embodiment, the power source 48 is an ultra-capacitor bank. In another embodiment, the power source 102 is a battery. It is to be noted that the coils 104 as illustrated in FIG. 2 are a simplified representation of the magnetizing coils in the magnetization fixture 12 of FIG. 1.

Furthermore, the magnetizing circuit 100 includes a semiconductor switch 106 connected in series with the coils 104 and the power source 102. In operation, the semiconducting switch 106 is configured to commutate current flow during discharging of ultra-capacitor bank 102 in the coils 104. This causes continuous flow of large current in the coils 104 only for a short duration and prevents any damage of the coils 104. The magnetization circuit 100 further includes a crowbar circuit 110 coupled across the coils 104. Thus, the crowbar circuit 110 provides a discharge path for the energy stored in the magnetizing fixture after the switch 106 is opened. In one embodiment, the crowbar circuit 110 is in a parallel configuration with the coils 104. The crowbar circuit 110 includes at least one crowbar diode 108. In one embodiment, the crowbar circuit 110 includes multiple crowbar diodes 108. Non-limiting example of the crowbar diode 108 includes a normal rectifier diode.

Figure 3:
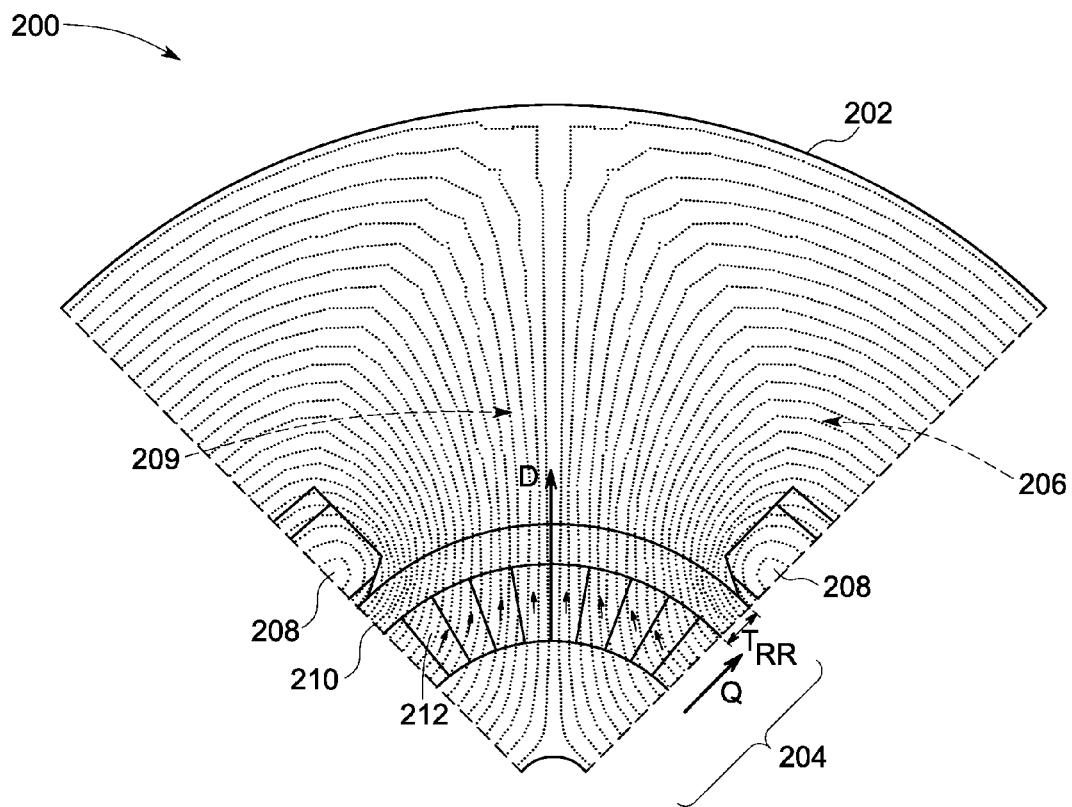
FIG. 3 is a schematic illustration of flux distribution at peak current in a quarter section of a magnetizer and a permanent magnet rotor in accordance with an exemplary embodiment of the invention.

FIG. 3 is a schematic illustration of a magnetizer flux distribution 200 of a quarter section of a magnetizer system 202 and a permanent magnet rotor assembly 204 in accordance with an exemplary embodiment of the invention. The quarter section 200 illustrates multiple magnetic flux lines 206 at peak current flow in the magnetizing circuit 100 (as shown in FIG. 2). When energized, the magnetizing coils 208 produce the magnetic flux lines 206 through a magnetizer pole piece 209, a retaining ring 210 and the rotor assembly 204. As illustrated herein, the magnetizer flux distribution 200 completely penetrates the rotor assembly 204 including the retaining ring 210 with a thickness $T_{RR}$. The center of each magnetizer pole is coincident with the D-axis of the rotor pole 210. As illustrated in the quarter section, the rotor pole 210 includes multiple permanent magnet segments 212 through which the magnetic flux lines passes and induces magnetization. The magnetic flux field also induces eddy currents in the retaining ring 210. The eddy currents in the retaining ring 210 act as reaction currents having a tendency to repel the magnetic flux generated in the magnetizer system 202. The reaction currents in the retaining ring 210, thus, impede the magnetization of the non-magnetized permanent magnet segments 212 in the rotor 204. In order to decimate the reaction currents in the retaining ring 210, the current flow of the magnetizer system 10 (as shown in FIG. 1) in the magnetizing circuit 100 (as shown in FIG. 2) is sufficiently held for an optimal duration of the magnetizer current pulse.

Figure 4:
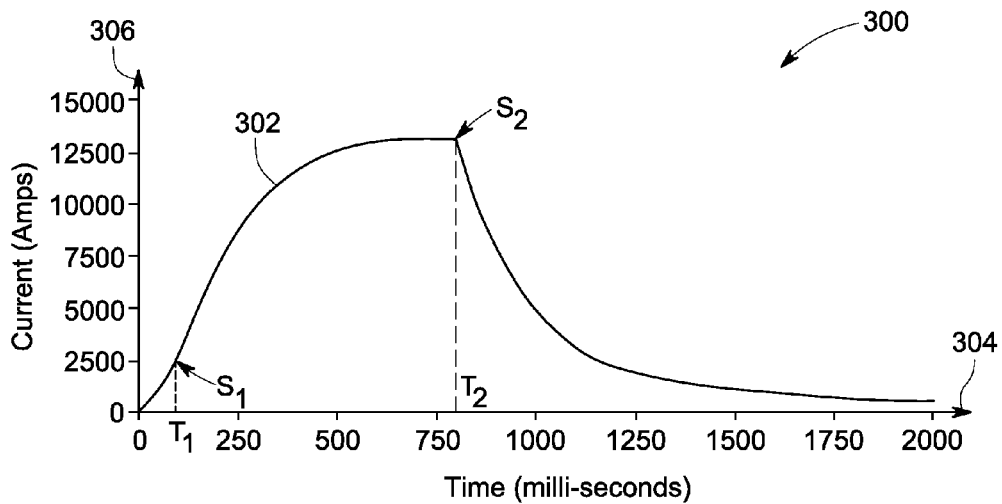
FIG. 4 is an exemplary graphical illustration of a magnetizer current pulse in accordance with an embodiment of the invention.

FIG. 4 is a graphical illustration 300 of an approximate quarter sinusoid of the magnetizer current pulse 302 in accordance with an exemplary embodiment of the invention. The graphical illustration 300 is a plot of magnetizer current versus time. The X-axis 304 represents time in milliseconds. The Y-axis 306 represents current in amperes. The graphical illustration 300 includes a time $T_1$, which correspond to a slope $S_1$ in the magnetizer current pulse 302. The slope $S_1$ represents a steep rise in the current pulse shape during discharging of current from the power source 102 (as shown in FIG. 2) to the magnetizing coils 208 (as shown in FIG. 3). The time period in magnetizer current pulse 302 before time $T_1$ illustrates unsaturated magnetization in the magnetization fixture 12 of FIG. 1. Further, the graphical illustration 300 also includes a time $T_2$, which correspond to a point $S_2$ in the magnetizer current pulse 302. The point $S_2$ represents a peak current and further implies saturated magnetization in the magnetization fixture 12 of FIG. 1. At time $T_2$ the semi-conductor switch 106 (of FIG. 2) is commutated, thereby, stopping the flow of current from the power source 102 (of FIG. 2). Thus, time period 0—$T_2$ (referred to as '$T_{RISE}$' hereinafter) signifies an optimal duration of the magnetizer current pulse 302 during which current flows through the magnetizing coils 208 (as shown in FIG. 3) in an increasing order till complete flux penetration in the magnet segments 212 is achieved. After time $T_2$, the current in the magnetizing circuit 100 of FIG. 2 starts fading away smoothly by resistive discharging through the crowbar diode 108 in the crowbar circuit 110 (shown in FIG. 2).

The time period $T_{RISE}$ required for complete flux penetration in the retaining ring 210 and magnet segments 212 (as shown in FIG. 3) may be sufficiently calculated using multiple parameters of the retaining ring of the rotor assembly. Non-limiting examples of such parameters may include resistivity ($\rho$), permeability ($\mu$) and retaining ring thickness $T_{RR}$. The retaining ring thickness $T_{RR}$ can be associated to an electrical skin depth thickness $\delta$. The electrical skin depth thickness ($\delta$) signifies an actual thickness within which generated eddy currents are confined at particular frequency (f) of an applied oscillating magnetic field, in a material having the properties of the retaining ring 210. The frequency (f) may be commonly referred to as a skin depth frequency. At any given frequency, the skin depth thickness ($\delta$) can be calculated using an equation of the form:

$$\delta = \sqrt{\frac{\rho}{\pi f \mu}} \quad (1)$$

Since the time period $T_{RISE}$ is generally equal to one-quarter of the fundamental-frequency period of the approximate one-quarter sinusoidal waveform of magnetizer current pulse 302, the time period $T_{RISE}$ may be related to skin depth frequency (f) as:

$$T_{RISE} = \frac{1}{4}\frac{1}{f} \quad (2)$$

In a particular embodiment, the retaining ring thickness $T_{RR}$ is smaller than one-tenth of the electrical skin depth thickness ($\delta$) of the retaining ring. This relationship substantially ensures extinction of eddy currents in the retaining ring and further ensures complete magnetic flux penetration in the retaining ring and magnet segments. Accordingly, the optimal time period $T_{RISE}$ for the case where the retaining ring thickness is one-tenth of the skin depth may be expressed using the above-mention equations (1) and (2) as:

$$T_{RISE} > 25 T_{RR}^2 \frac{\pi \mu}{\rho} \quad (3)$$

Thus, the time period $T_{RISE}$ in the equation (3) provides for an optimal duration of current flow for ensuring complete magnetic flux penetration in the retaining ring and magnet segments. The optimal "on time" of the switch in the magnetizer current pulse 302, as illustrated in FIG. 4, is the time period $T_{RISE}$.

Figure 5:
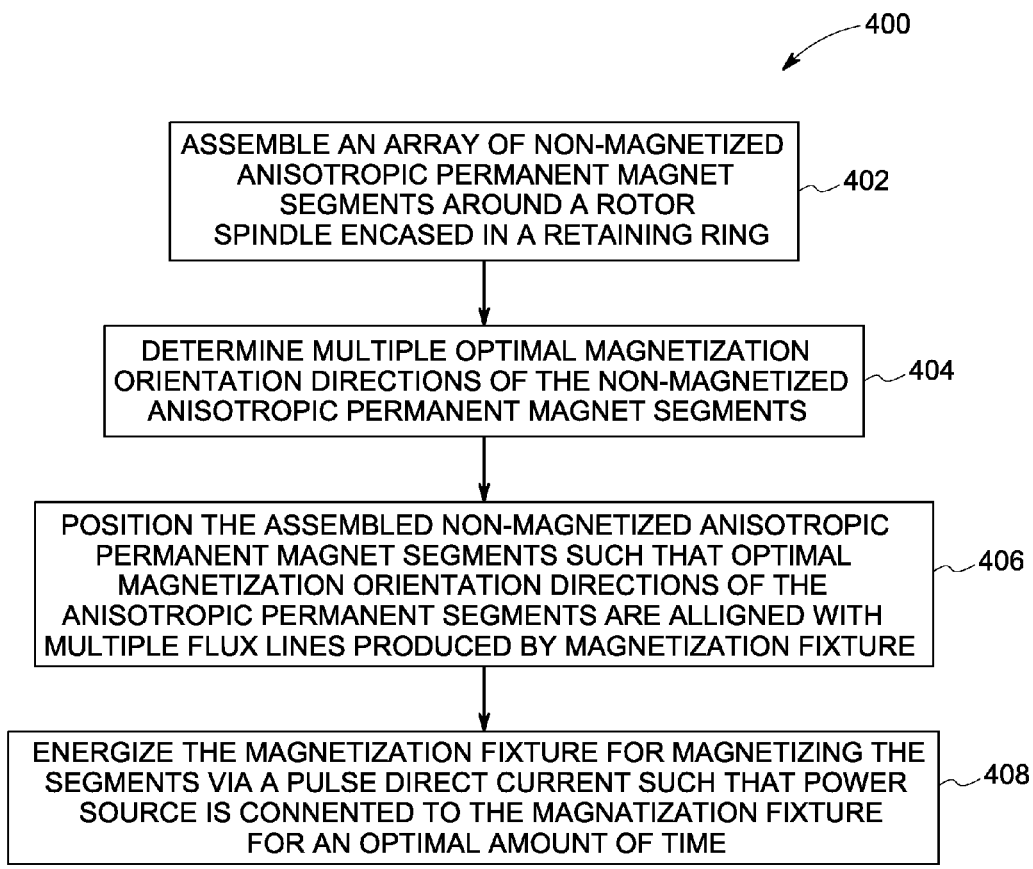
FIG. 5 is a flow chart of a magnetizing method of a rotor of an electrical machine in accordance with an exemplary embodiment of the invention.

FIG. 5 is a flow chart of a magnetizing method 400 of the rotor of an electrical machine in accordance with an exemplary embodiment of the invention. At step 402, the method includes assembling an array of non-magnetized anisotropic permanent magnet segments around a rotor spindle encased in a retaining ring. The method also includes determining multiple optimal magnetization orientation directions of the non-magnetized permanent magnet segments in step 404. Some magnetic materials have anisotropic magnetic properties, with a preferred directionality for magnetization. The segments of permanent magnets are produced and positioned on the rotor such that the direction of preferred magnetization nearly aligns with the expected lines of flux at the peak of the magnetization pulse. Further, the method step 406 includes positioning the assembled non-magnetized permanent magnet segments based on the determined orientation directions in a magnetization fixture. Finally, at step 408, the method includes energizing the magnetization fixture for magnetizing the segments via a pulse direct current for an optimal duration of the pulse. In one embodiment, the energizing includes controlling a pulse direct current through the energizing coils of the magnetizing fixture for determined time period. Thus, the step 408 essentially includes electrical connection of the power source to the magnetization fixture for an optimal amount of time. As discussed above, the period of time is the determined time period $T_{RISE}$, which is the pulse rise time of the approximate one-fourth sinusoidal waveform of the magnetizer current pulse. The energization of the magnetization fixture for time period $T_{RISE}$, provides for an optimal magnetic flux penetration through the retaining ring in the rotor assembly. This subdues the generation of eddy currents in the retaining ring, thereby, preventing any opposition to the magnetization of the non-magnetized permanent magnet segments of the rotor assembly.

Figure 6:
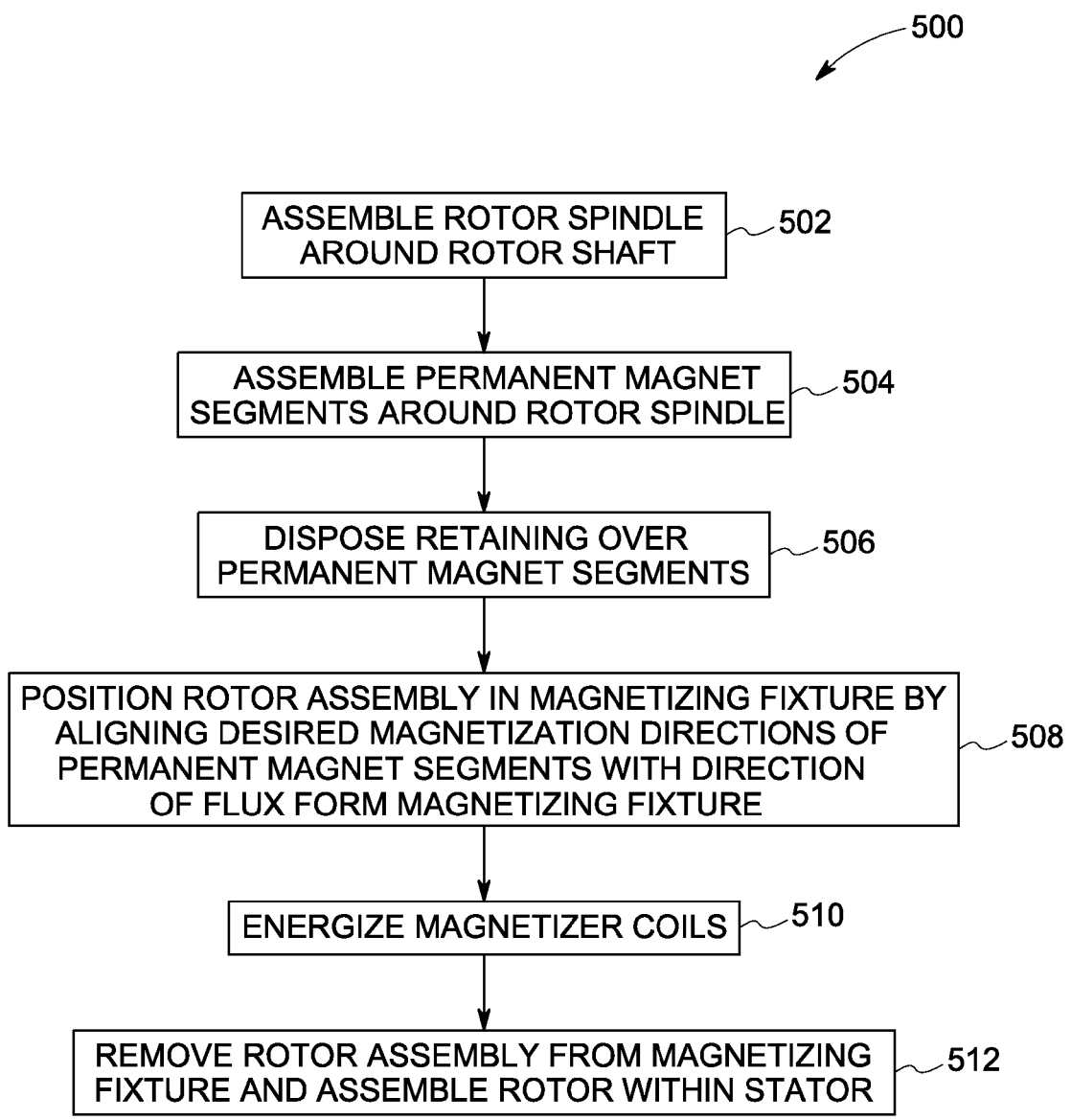
FIG. 6 is a flow chart illustrating an exemplary method of manufacturing a rotor of an electrical machine in accordance with an embodiment of the invention.

FIG. 6 is a flow chart illustrating an exemplary method of manufacturing 500 a rotor of an electrical machine in accordance with an embodiment of the invention. The method begins by assembling a rotor spindle around a shaft, as indicated at step 502. As discussed earlier, in certain embodiments, the shaft may be formed integral to the rotor spindle. At step 504, the permanent magnet segments are assembled around the rotor spindle, such that the preferred magnetization direction in individual magnet segments approximately corresponds with the lines of flux produced at the peak of the magnetization pulse. In one embodiment, theses segments are adhesively bonded to each other and to the rotor spindle. A retaining ring may be disposed around the permanent magnet segments, as indicated at step 506. Thus, the method includes providing the rotor assembly with an array of non-magnetized permanent magnet segments around the rotor spindle encased in the retaining ring. The method then proceeds at step 508 by positioning the rotor assembly within a magnetizing fixture of a magnetizer system. As explained earlier, step 508 includes aligning magnetization directions of the permanent magnet segments with the calculated direction of flux from the magnetizing fixture. The magnetizing coils are then energized by a power source, as indicated at step 510. This power source may be tuned to the magnetizing fixture so that the internal impedance of the source under load approximately matches the impedance of the magnetizing fixture. This allows for the maximum utilization of the energy transfer capability of the power source. Once the permanent magnet segments are magnetized, the rotor assembly is removed from the magnetizing fixture and is assembled within the stator (step 512). As will be appreciated by those skilled in the art, the process 500 may be implemented by a fully automated assembly line, semi-automatically, or even manually.

Advantageously, the present technique ensures that complete magnetization of the rotor assembly is performed by shaping the magnetizer current pulse such that retaining ring reaction currents extinguish over the application of the pulse and do not reduce the magnetizing flux in the bulk of the permanent magnet material undergoing magnetization. The present technique may facilitate magnetization of an electrical machine rotor in a one-step process, thus obviating the need to assemble the rotor from pre-magnetized blocks, which may be cumbersome and difficult as discussed earlier. The resulting magnetized rotor produces an improved sinusoidal shaped flux distribution within the electric machine. The present technique can be incorporated in a wide range of electrical machinery, including motors, and particularly including large high-speed synchronous machines for gas line compressors, aerospace motors, aerospace generators, marine propulsion motors, among others.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for magnetizing a rotor of an electrical machine, the method comprising:
assembling an array of non-magnetized anisotropic permanent magnet segments around a rotor spindle encased in a retaining ring;
determining a plurality of optimal magnetization orientation directions of the non-magnetized anisotropic permanent magnet segments;
positioning the assembled non-magnetized anisotropic permanent magnet segments around the rotor spindle such that the optimal magnetization orientation directions of the anisotropic permanent magnet segments are aligned with a plurality of flux lines produced by a magnetization fixture; and
energizing the magnetization fixture for magnetizing the segments via a pulse direct current for an optimal duration of the pulse, wherein the optimal duration of the pulse is a function of thickness, magnetic permeability, and resistivity of the retaining ring, and the optimal duration is given by an expression of $$T_{RISE} > 25 T_{RR}^2 \frac{\pi \mu}{\rho},$$

where $T_{RISE}$ is the time period for optimal duration, $T_{RR}$ is the retaining ring thickness, $\mu$ is the magnetic permeability and $\rho$ is resistivity of the retaining ring.

2. The method of claim 1, wherein said energizing comprises electrical connection of the power source to the magnetization fixture for an optimal amount of time.

3. The method of claim 1, wherein said energizing the magnetization fixture for the optimal duration of the pulse provides for an optimal magnetic flux penetration through the retaining ring.

4. The method of claim 1, wherein the thickness of the retaining ring is smaller than about one-tenth of an electrical skin depth thickness of the retaining ring.

5. The method of claim 1, wherein the retaining ring is made up of a high strength metal.

6. The method of claim 1, wherein the optimal magnetization orientation directions of the permanent magnet segments are generally aligned with a direction of flux produced by the magnetizing fixture.

7. The method of claim 1, wherein said assembling comprises assembling the non-magnetized permanent magnet segments in a circular pattern on a rotor spindle encased in the metallic ring prior to positioning the non-magnetized permanent magnet segments in the magnetization fixture.

8. The method of claim 1, wherein the magnetizing fixture comprises a plurality of coils wound around a magnetic core, the coils being equal in number to a number of poles of the rotor.

9. The method of claim 1, wherein said determining the desired orientation directions of the permanent magnet segments comprises using finite element analysis.

* * * * *